United States Patent [19]

Polette et al.

[11] 3,710,563
[45] Jan. 16, 1973

[54] ROTARY EDGER FOR USE WITH POWER DRIVEN LAWN MOWER

[76] Inventors: Melvin Polette, 2223 Wilding Drive; George P. Newell, 8101 Ellerton, both of Overland, Mo. 63114

[22] Filed: Nov. 9, 1970

[21] Appl. No.: 87,984

[52] U.S. Cl. .....................56/16.9, 56/11.8, 56/256
[51] Int. Cl. ............................................A01d 35/26
[58] Field of Search............56/11.3, 11.7, 11.8, 16.9, 56/172, 256; 172/15

[56] References Cited

UNITED STATES PATENTS

| | | | |
|---|---|---|---|
| 3,019,585 | 2/1962 | Wellborn | 56/256 X |
| 3,421,300 | 1/1969 | Rhodes | 56/16.9 X |
| 2,603,931 | 7/1952 | Pivert | 56/256 X |
| 2,771,730 | 11/1956 | True | 56/256 X |
| 2,535,812 | 12/1950 | Phillips | 56/11.7 |
| 872,861 | 12/1907 | Theberath | 56/256 UX |
| 2,782,584 | 2/1957 | Lokey | 56/256 X |
| 3,057,411 | 10/1962 | Carlton | 56/256 X |

FOREIGN PATENTS OR APPLICATIONS

| | | | |
|---|---|---|---|
| 773,844 | 12/1967 | Canada | 56/256 |
| 966,428 | 8/1964 | Great Britain | 56/16.9 |

*Primary Examiner*—Louis G. Mancene
*Assistant Examiner*—J. A. Oliff
*Attorney*—Polster and Polster

[57] ABSTRACT

A rotary lawn mower having a motor, a housing, four ground-engaging wheels, a horizontal blade for lawn mowing and a vertical blade for edging. The edger blade is part of an edger assembly mounted on the housing inside a front wheel of the mower. The edger assembly includes a subassembly which is slidably mounted on the housing for vertical movement into and out of an operative position. The edger assembly also includes a vertically fixed subassembly including a drive pulley, a clutch member rotatably mounted on the housing and a camming means for moving the vertically movable part of the edger assembly downward into its operative position and upward out of its operative position. The movable subassembly includes a vertically extending drive shaft extending through the pulley and the first clutch member. A spring-loaded second clutch member is slidably mounted on the shaft above the first clutch member for engaging the first clutch member when the movable assembly is moved downward. The vertically movable subassembly also includes a gear box connecting the vertically extending drive shaft to a horizontally extending drive shaft, the edger blade, blade guards, and a guide blade extending ahead of the front mower wheel in substantially the same plane as the edger blade. The edger blade is in the form of a star having alternate skewed sharpened forward edges and straight blunt forward edges for respectively cutting sod and breaking it out.

22 Claims, 4 Drawing Figures

INVENTOR
MELVIN POLETTE
GEORGE P. NEWELL 3,710,563

ROTARY EDGER FOR USE WITH POWER DRIVEN LAWN MOWER

BACKGROUND OF THE INVENTION

This invention relates to an edger having particular use in combination with a power lawn mower. Combination edgers and power mowers have long been described, and the advantages of such a combination have long been recognized. However, for a variety of reasons, apparently including their expense, the inconvenience in converting from mowing to edging, their relative ineffectiveness, and their inherent danger, they have never been widely sold or used.

One of the objects of this invention is to provide an edger which is simpler, easier to move into operative position and easier to use than edgers known heretofore.

Another object is to provide such an edger which is easily adaptable to a standard power mower.

Still another object is to provide such an edger which is less likely to be dangerous than presently known edgers.

Other objects will occur to those skilled in the art in the light of the following description and accompanying drawing.

SUMMARY OF THE INVENTION

In accordance with one aspect of the invention a combination rotary mower and rotary edging device is provided having a housing, four ground-engaging wheels rotatably mounted on the four corners of the housing, a prime mover mounted on the housing, a horizontally extending mower blade rotatably mounted in the housing for rotation by the prime mover and an edger assembly mounted on the housing. The edger assembly includes a vertically extending edger blade and means operatively connecting the edger blade to the prime mover for rotation by the prime mover. In accordance with this aspect of the invention, the edger blade is mounted adjacent one of the wheels, between the wheel and the housing. Preferably, the wheel is a front wheel which is easily adjustable vertically for adjusting the depth of cut of the edger blade, and the front wheel is mounted on a bracket which surrounds the edger blade and is secured to the housing. Also, the device preferably includes a guide blade rotatably mounted on the housing forward of the housing and the ground-engaging wheels, the guide blade rotating in substantially the same plane as the edger blade and extending to substantially the same depth as the edger blade. This guide blade forms another aspect of the invention, and may be used in other combination edgers and mowers. Preferably, it is part of a vertically movable subassembly which also includes the edger blade, and both the guide an edger blades are movable from an edging position to a non-edging position. Preferably, the movable subassembly also comprises a vertically extending shaft and a first clutch part carried by the shaft for rotation with the shaft. The edger assembly also includes a vertically fixed subassembly which includes a second clutch part driven by the prime mover, the second clutch part being arranged to engage the first clutch part when the vertically movable assembly is moved to its edging position. This combination of subassemblies making up the edger assembly comprises still another aspect of the invention, and is also adaptable to other combination edgers and mowers, although its use in the preferred embodiment is particularly advantageous. In the preferred embodiment, the second clutch part is concentric with the shaft and is freely rotatable with respect to the shaft, and the first clutch part is vertically slidable on the shaft and is spring-biased into engagement with the second clutch part when the movable subassembly is in its edging position. Also in the preferred embodiment, the edger blade is mounted on a horizontally extending shaft which is connected to the vertically extending shaft through a gear box, and the entire vertically movable assembly is moved in a vertically extending trackway by a cam. Also in the preferred embodiment, the first clutch part is connected to a pulley which is driven by the prime mover through a drive belt. Also in the preferred embodiment alternate arms of the edger blade lie in a common plane, the others being skewed from the plane, only the skewed arms being sharpened.

DESCRIPTION OF THE PREFERRED EMBODIMENT

Figure 4:
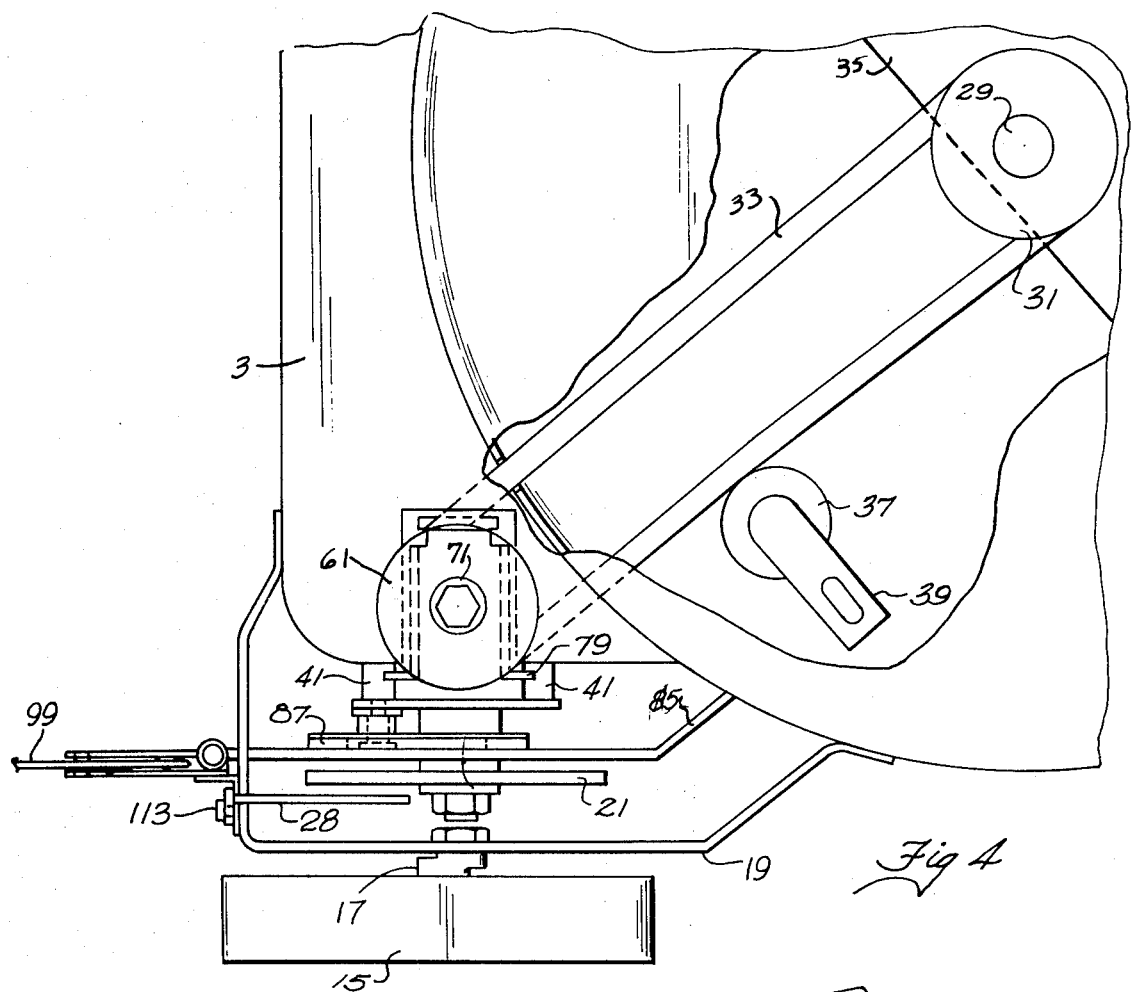
FIG. 4 is a somewhat diagrammatic top plan view of the mower-edger of FIGS. 1–3, part of the mower housing being broken away, showing the relative positioning of the parts and the attachment of the edger to the mower housing.
Figure 1:
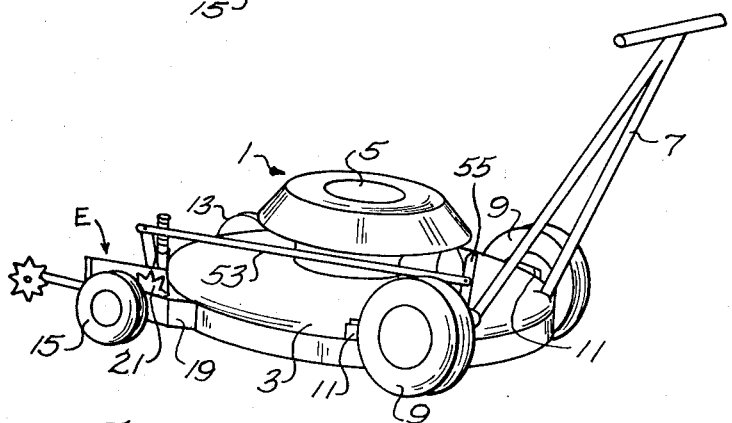
FIG. 1 is a view in perspective of one illustrative embodiment of combination mower-edger of this invention.
Figure 2:
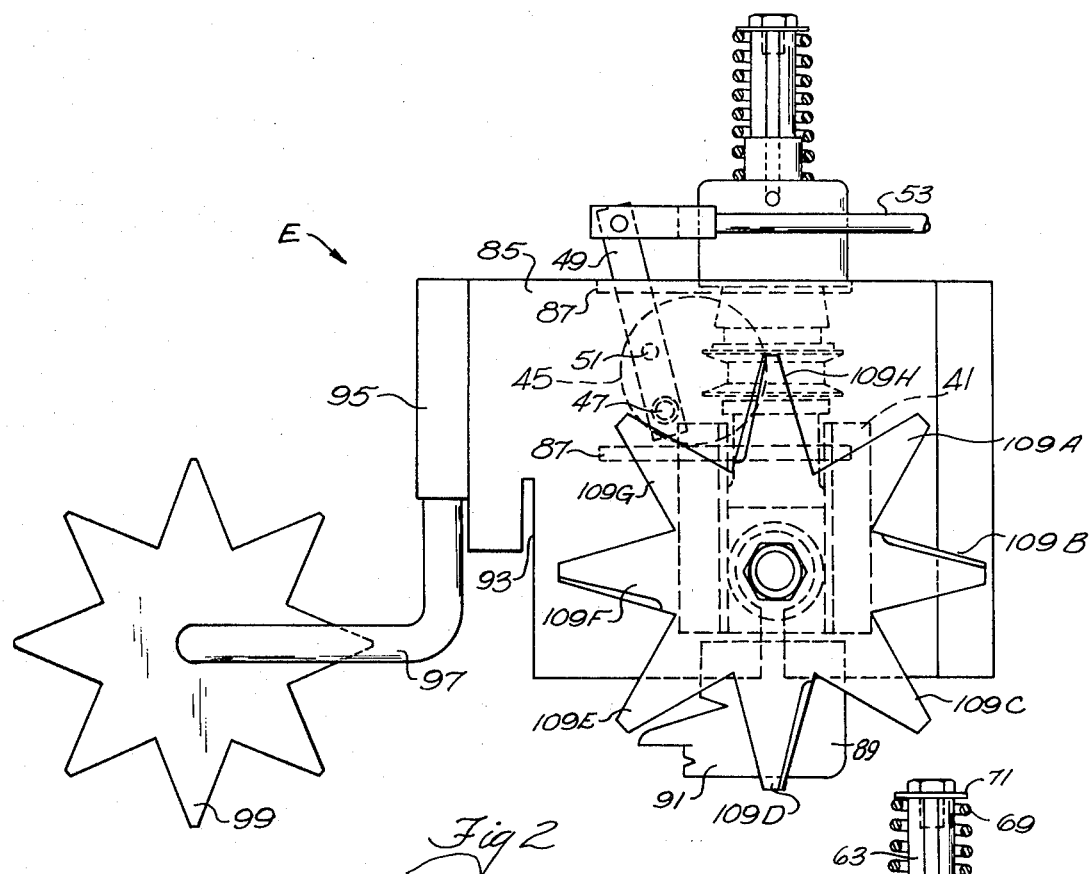
FIG. 2 is a view in side elevation of the edger assembly of the mower-edger shown in FIG. 1.
Figure 3:
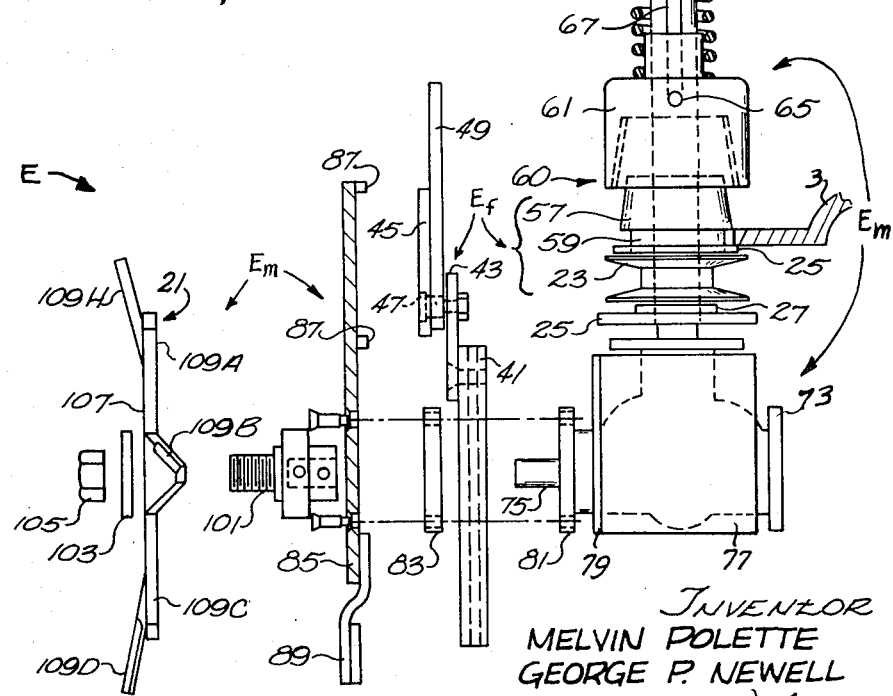
FIG. 3 is an exploded view in rear elevation of the edger assembly of FIG. 2.

Referring now to the drawings, reference numeral 1 indicates one illustrative embodiment of mower-edger device of this invention. The mower-edger includes a housing 3 on which is mounted a prime mover 5 in the form of a gasoline engine. A handle 7 is provided for pushing the mower-edger. Freely rotatable rear wheels 9 are mounted at the rear corners of the housing 3 by means of quick-adjust mountings 11, for easy adjustment of the height of the wheels. A first front wheel 13 is freely rotatably mounted on the front right corner of the housing 3 through a quick-adjust mounting, and a second front wheel 15 is freely rotatably mounted through a quick-adjust mounting 17 to a bracket 19 at the front left corner of the housing 3.

Adjacent the front wheel 15 and interior of it is an edger blade 21, which forms a part of an edger assembly E. The edger assembly E includes a vertically fixed subassembly $E_f$ and a vertically movable subassembly $E_m$.

The vertically fixed subassembly $E_f$ includes a pulley 23 rotatably mounted to the lower face of the housing 3 by a bifurcated bracket 25. A bronze washer 27 provides a bearing surface for the pulley 23. The pulley 23 is driven by a drive shaft 29 of the engine 5 through a pulley 31 on the drive shaft 29 and a V-belt 33. A mower blade 35 is also mounted on the drive shaft 29 below the pulley 31. An idler pulley 37 is rotatably mounted on the housing 3 by a slidable mounting 39, for providing proper tensioning of the belt 33.

The fixed subassembly $E_f$ also includes a pair of vertically extending slide blocks 41 mounted to the housing 3 for slidably supporting the movable subassembly $E_m$. A cam support plate 43 is bolted to the outer faces of the slide blocks 41 at their upper ends. A cam 45 is rotatably secured to the plate 43 by a pivot bolt 47. A handle 49 is secured to the cam 45 at the pivot 47 and by a bolt 51 spaced from the pivot 47. A pull rod 53 pivotally secured to the free end of the handle 49 provides a linkage to a control handle 55 which is pivotally connected at its lower end to the housing 3.

The fixed subassembly $E_f$ also includes the inner part 57 of a cone clutch 60. The clutch part 57 is concentric with the pulley 23 and is secured to the pulley 23 for rotation with it. A bushing 59 secured to the lower pulley support 25 provides a bearing surface for the pulley 23 and clutch part 57.

The movable edger subassembly $E_m$ includes the outer part 61 of the cone clutch 60. The outer clutch part 61 is slidably mounted on a shaft 63 by means of a key pin 65 extending through the clutch part 61 and riding in a longitudinally keyway 67 in the shaft 63. A coil spring 69 encompassing the shaft 63 is compressed between the upper face of the clutch part 61 and a washer 71 bolted to the upper face of the shaft 63. The spring 69 thus biases the outer clutch 61 to its lowermost position, in which the key pin 65 lies at the bottom of the keyway 67.

The shaft 63 is the vertically extending shaft of a gear box 73 having a one-to-one gearing ratio to a horizontally extending shaft 75. Mounted on the forward and rearward faces of the gearbox 73 are a pair of support brackets 77 having outwardly turned flanges 79 which are slidably supported by the vertical slide blocks 41 of the fixed subassembly $E_f$. It will be seen that the bracket 77 and slide blocks 41 provide a slidable support for the movable subassembly $E_m$ which allows only vertical motion of the movable subassembly. The slide blocks 41 and pulley supports 25 are so positioned that the gear box 73 and shaft 63 are slidable from an upper position in which the clutch 60 is disengaged, to a partially lowered position in which the clutch 60 is engaged, and to a still lower operating position.

Mounted on a flange 81 of the gear box 73 are a spacer 83 and a support plate 85. The plate 85 acts as a protective cover for the parts of the edger assembly interior of it and also acts as a mounting plate for a pair of horizontally extending cam rails 87 and a grass guide blade 89. The cam rails 87 are spaced apart to receive the cam 45 between them. Because of the eccentric pivot of the cam 45, the vertical position of the movable subassembly $E_m$ is determined by the rotational position of the cam 45. The grass guide blade 89 has an inwardly curved, toothed forward edge 91 for lifting grass adjacent a paved surface.

The forward end of the plate 85 extends over the bracket 19 and is slotted, as shown at 93, to accommodate the bracket 19. Welded to the forward end of the plate 85 is a bracket 95 for supporting an arm 97 at the end of which a guide blade 99 is rotatably mounted. The guide blade 99 is a flat eight-pointed star.

Mounted on the horizontally extending shaft 75 of the gear box 73, for rotation with it, is a threaded collar 101 to which the edger blade 21 is held by a washer 103 and nut 105. The edger blade 21 is in the form of an eight-pointed star having a central hub part 107 and eight outwardly convergent arms 109. Alternate arms 109a, 109c, 109e and 109g lie in a common plane perpendicular to the shaft 75. The remaining arms 109b, 109d, 109f and 109h are also flat, but are skewed from the plane of the other arms. Diametrically opposed blades 109b and 109f are skewed inward from the hub part to their tips, and the other diametrically opposed arms 109d and 109h are skewed outward. The forward edges of the skewed blades are sharpened for cutting sod and the arms lying in a common plane are blunt on their forward edges for removing the cut sod.

The edger blade 21 and the guide blade 99 lie in substantially the same plane, with the guide blade being offset slightly inwardly to lie in a plane through the tips of the inwardly skewed blades 109b and 109f. The edger blade and guide blade extend to approximately the same depth when the movable subassembly is in its operating position.

Attached to the forward face of the bracket 19 is a second grass guiding blade 28. The blade 28 is contoured as the mirror image of the first guide blade 89 and is adjustably mounted by means of a wing nut 113. The second guide blade 28 may be used for edging and trimming jobs for which the first grass guiding blade cannot be positioned against the pavement, such as along a curb.

In use, the movable subassembly $E_m$ of the edger is normally maintained in its upper, disengaged, position by moving the control handle 55 forward. In this position, the pulley 23 and inner clutch part 57 are rotated by the prime mover 5, but the clutch 60 is disengaged.

When it is desired to place the edger in motion, the control handle 55 is pulled back to rotate the cam 45 and lower the movable subassembly $E_m$. As the movable subassembly $E_m$ is moved downward, the outer part 61 of the cone clutch 60 engages the inner part 57, causing the shaft 63, hence the horizontal shaft 75 of the gear box, to rotate. The edger assembly is preferably proportioned in such a way that the clutch 60 engages immediately before the point at which the blade 21 touches the ground. Thus, the edger blade 21 is allowed to come to speed before touching the ground, but will be stopped if it engages an object extending substantially above ground level. The cam 45 is so proportioned that the blade is extended to a maximum depth by movement of the handle 55. Therefore, the depth of cut of the blade 21 is dependent on the vertical setting of the adjacent front wheel 15, as set by the wheel adjustment 17. Of course, when this wheel adjustment is changed, it is also desirable to change the height of one of the other wheels to insure that all four wheels engage the ground.

The guide blade 99 and the grass trimming blades 89 and 28 enable the user of the mower to cut an extremely accurate line, along a pavement edge or otherwise. They also make use of the mower-edger far safer along a pavement edge than devices known heretofore.

Numerous variations in the mower-edger of this invention, within the scope of the appended claims, will be apparent to those skilled in the art in the light of the foregoing description. For example, the guide blade 99 may be movable vertically with respect to the edger blade 21, and may be pivotable about the bracket 95 for edging in close quarters or in patterns involving small turning radii. The grass guiding blades may both be movable with the movable edger subassembly, or may both be movable independent of the movable subassembly, and may be replaced with other guides or omitted. The edger blade may have alternate arms skewed in the same direction, or all the arms may be sharpened, or all the arms may lie in the same plane for a narrow cut. The edger blade, guide blade and other features of the invention may be used in an edger of this invention on a mower having only three wheels or may be used without the mower. Other raising and lowering mechanisms, other drives and other clutches may be used. These variations are merely illustrative.

Having thus described the invention, what is claimed and desired to be secured by Letters Patent is:

1. A combination rotary mower and rotary edger device comprising:
   a housing;
   four ground-engaging wheels rotatably mounted at four corners of the housing;
   a prime mover mounted on the housing, said prime mover having a vertically extending drive shaft extending through the housing;
   a horizontally extending mower blade carried by said prime mover shaft in the housing for rotation by the prime mover;
   a first pulley mounted on the prime mover drive shaft;
   an edger assembly mounted on the housing, said edger assembly including
      a vertically movable subassembly comprising a horizontally extending rotatable shaft, a vertically extending edger blade mounted on said horizontally extending shaft for rotation with said horizontally extending shaft, a rotatable vertically extending shaft, means forming a driving connection between said vertically extending shaft and said horizontally extending shaft, and a first clutch means carried by said vertically extending shaft for rotation with said vertically extending shaft, said vertically movable subassembly being movable to an edging position in which the edger blade extends below ground level, and to a non-edging position in which the edger blade is spaced above ground level, said edger blade being positioned adjacent one of said wheels, between said one wheel and said housing interior of said one wheel;
      a vertically fixed subassembly comprising a second pulley and second clutch means operatively connected to said first pulley for rotation therewith; and
      means for selectively moving said first clutch means and said second clutch means into engagement; and endless belt means forming a driving connection between said first pulley and said second pulley.

2. The device of claim 1 wherein said first pulley is positioned within said housing, between said housing and said mower blade.

3. The device of claim 2 wherein the second pulley and second clutch means are both coaxial with said vertically extending shaft of said vertically movable subassembly, and said means for selectively moving said first clutch means and said second clutch means into engagement comprises means for simultaneously moving said vertically movable subassembly toward said edging position, said first clutch means and said second clutch means being positioned to engage before said vertically movable subassembly is wholly in said edging position.

4. A combination rotary mower and rotary edger device comprising a housing, four ground-engaging wheels rotatably mounted at four corners of the housing, a prime mover mounted on the housing, a horizontally extending mower blade rotatably mounted in the housing for rotation by the prime mover, and an edger assembly mounted on the housing, said edger assembly including a vertically extending edger blade rotatably mounted in said edger assembly and edger blade driving means operatively connecting said edger blade to said prime mover for rotation of said edger blade by said prime mover, said edger blade being mounted adjacent one of said wheels between said one wheel and said housing interior of said one wheel.

5. The device of claim 4 wherein said one wheel and at least another of said wheels are adjustable vertically with respect to said housing, whereby the depth of cut of said edger blade may be determined by adjustment of said one wheel and stability of said device may be maintained by adjusting said other wheel.

6. The improvement of claim 4 including a bracket secured to said housing, said bracket and said housing surrounding said edger blade, said one wheel being mounted on said bracket.

7. The improvement of claim 4 wherein said one wheel is a front wheel of said device.

8. The improvement of claim 7 including a freely rotatable guide blade positioned forward of the housing and of the ground-engaging wheels, said guide blade rotating in substantially the same plane as said edger blade and extending to substantially the same depth as said edger blade.

9. The device of claim 4 wherein the axis of rotation of said one wheel lies within the ambit of said edger blade.

10. A combination rotary mower and rotary edger device comprising a housing having four corners, at least three ground-engaging wheels rotatably mounted on the housing, a prime mover mounted on the housing, a horizontally extending mower blade rotatably mounted in the housing for rotation by the prime mover, and an edger assembly mounted at a forward corner of the housing, said edger assembly including a vertically extending edger blade, means operatively connecting said edger blade to said prime mover for rotation of said edger blade by said prime mover and a freely rotatable guide blade positioned forward of the edger blade, of the housing and of the three ground-engaging wheels, said guide blade rotating in substantially the same plane as said edger blade and extending to substantially the same depth as said edger blade, said edger assembly comprising a movable subassembly including said edger blade and said guide blade, said movable subassembly being movable vertically to an edging position in which the edger blade and the guide blade extend below ground level, and to a non-edging position in which the edger blade and the guide blade are spaced above ground level.

11. The device of claim 10 wherein the guide blade is star-shaped.

12. The device of claim 10 wherein the movable subassembly also comprises a vertically extending shaft and a first clutch part carried by the shaft for rotation with the shaft, and including a vertically fixed subassembly comprising drive means driven by said prime mover, said drive means comprising a second clutch part, said second clutch part being arranged to engage said first clutch part when said vertically movable assembly is moved to its edging position.

13. The device of claim 9 wherein the edger blade comprises a central hub and a plurality of broad flat arms extending from the hub and tapering toward their free ends, alternate arms of said blade lying in a common plane, the other of said arms being skewed from said plane.

14. The device of claim 13 wherein alternate of said arms skewed from said plane are skewed in opposite directions, and wherein the arms skewed from said plane are sharpened along their forward edges and the arms lying in the plane are dull on their forward edges.

15. In a combination mower and rotary edger device comprising a housing, at least three ground-engaging wheels rotatably mounted on the housing, a prime mover mounted on the housing, and a mower blade rotatably mounted in the housing for rotation by the prime mover, the improvement comprising an edger assembly, said edger assembly comprising:

a vertically movable subassembly comprising a horizontally extending rotatable shaft, a vertically extending edger blade mounted on said horizontally extending shaft for rotation with said horizontally extending shaft, a rotatable vertically extending shaft, means forming a driving connection between said vertically extending shaft and said horizontally extending shaft, and a first clutch part carried by said vertically extending shaft for rotation with said vertically extending shaft, said vertically movable subassembly being movable to an edging position in which the edger blade extends below ground level, and to a non-edging position in which the edger blade is spaced above ground level, and a vertically fixed subassembly comprising drive means driven by said prime mover, said drive means comprising a second clutch part, said second clutch part being arranged to engage said first clutch part when said vertically movable assembly is moved to its edging position.

16. The improvement of claim 13 wherein said horizontally extending shaft is connected to said vertically extending shaft through a gear box.

17. The improvement of claim 13 including a vertically extending trackway in said vertically fixed subassembly, said vertically movable subassembly being slidably mounted in said trackway, and including cam means for vertically positioning said vertically movable subassembly in said trackway.

18. The improvement of claim 15 wherein said drive means of said vertically fixed subassembly includes a pulley concentric with said second clutch part and connected to said second clutch part for rotation with said second clutch part, and a drive belt on said pulley for transmitting power from said prime mover to said pulley.

19. The improvement of claim 15 wherein said edger blade is positioned adjacent a front wheel of the device, between said front wheel and said housing.

20. The improvement of claim 15 wherein said vertically movable assembly includes a freely rotatable guide blade positioned forward of the housing and of the ground-engaging wheels, said guide blade rotating in substantially the same plane as said edger blade and extending to substantially the same depth as said edger blade.

21. The improvement of claim 15 wherein at least one of said clutch parts is movable away from the other said clutch part when said vertically movable subassembly is in its edging position, and including biasing means for biasing said one of said clutch parts into engagement with said other clutch part.

22. The improvement of claim 15 wherein said second clutch part is concentric with said vertically extending shaft and is freely rotatable with respect to said vertically extending shaft, said first clutch part being vertically slidable on said vertically extending shaft, said first clutch part being slidable away from said second clutch part when said vertically movable subassembly is in its edging position, and including a spring biasing said first clutch part into engagement with said second clutch part when said vertically movable subassembly is in its edging position.

* * * * *